W. M. WHITE.
RETURN REGAINER.
APPLICATION FILED MAR. 24, 1916.

1,264,730.

Patented Apr. 30, 1918.
2 SHEETS—SHEET 1.

Witnesses:

Inventor
William M. White.

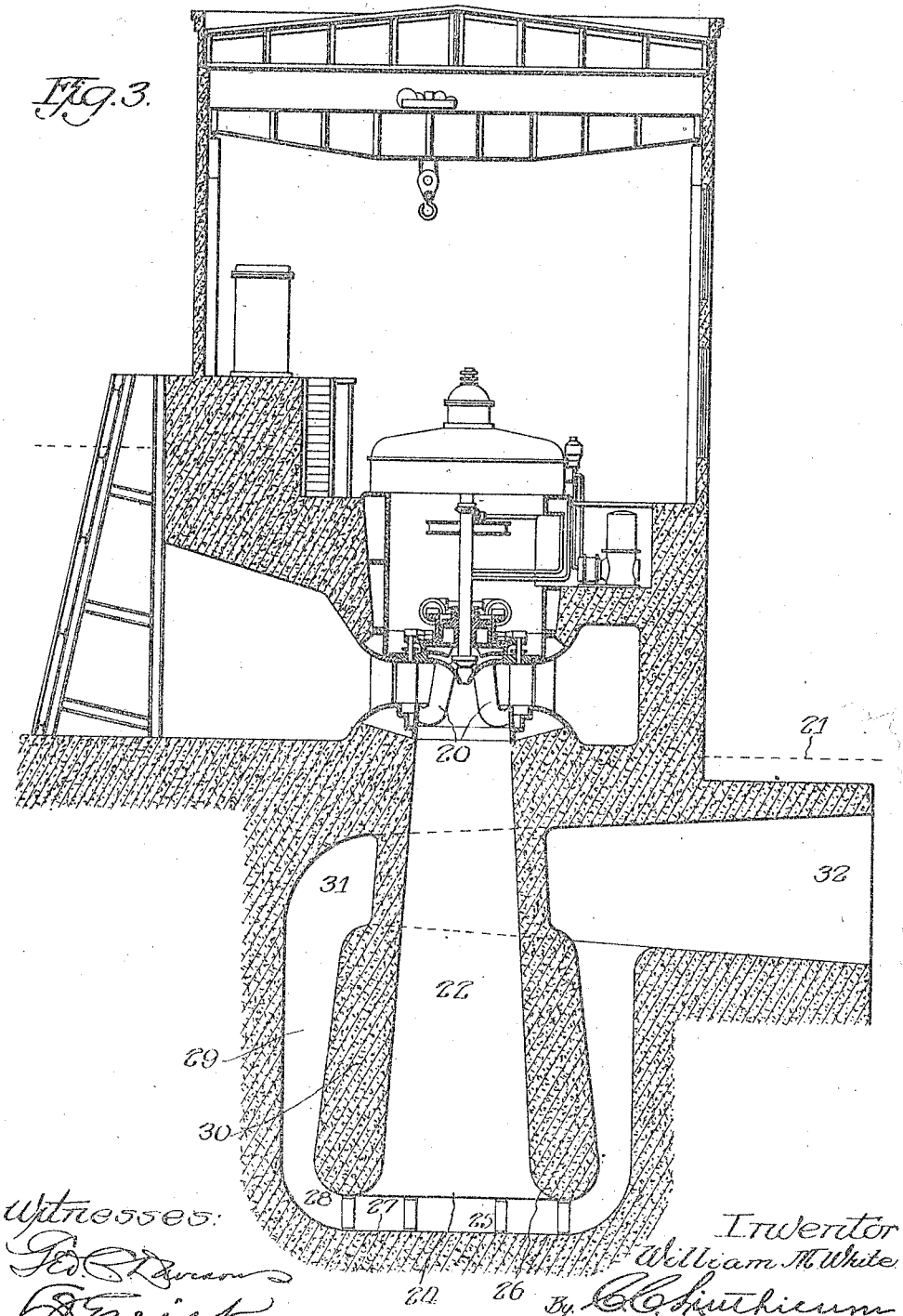

UNITED STATES PATENT OFFICE.

WILLIAM M. WHITE, OF MILWAUKEE, WISCONSIN.

RETURN-REGAINER.

1,264,730.

Specification of Letters Patent.  Patented Apr. 30, 1918.

Application filed March 24, 1916. Serial No. 86,388.

*To all whom it may concern:*

Be it known that I, WILLIAM M. WHITE, a citizen of the United States, residing at Milwaukee, in the county of Milwaukee and State of Wisconsin, have invented certain new and useful Improvements in Return-Regainers, of which the following is a specification.

The invention relates to means for guiding and controlling the action of a body of water flowing through a closed conduit.

The invention designs more particularly to provide in the discharge conduit leading from a water wheel or a centrifugal pump or other hydraulic device, a means for regaining pressure from velocity of the water flowing from said device with good efficiency in as short distance as possible measured in the direction of flow of the water as it issues from the said device.

In water power plants operating under low heads it is necessary to place the water wheel near the level of the water in the tail race in order that there may be sufficient depth of water above the water wheel at all times to prevent air being drawn into the water wheel. By reason of having the water wheel near the surface of the tail water it is not possible with the present forms of draft tubes to regain the energy discharged from the water wheel runner with good efficiency.

It is one of the objects of this invention to provide a discharge conduit for water wheels operating under low heads for converting velocity into pressure to increase the effective head acting on the wheel and consequently increase the efficiency of the wheel.

The invention further designs to provide a discharge conduit for water wheels operating under low heads which consists of a straight axis regaining section communicating with the discharge of the water wheel and gradually increasing in the direction of flow, a chamber at the end of said section, a passageway, preferably annular in section, surrounding and enveloping the first mentioned regaining section communicating with the chamber and gradually increasing in the direction of flow, and a discharge conduit from said enveloping passage communicating with the tail water near the lower end of the wheel.

The invention further designs to provide a new and improved, what I have termed, return regainer.

The invention consists in the several features hereinafter set forth and more particularly defined by claims at the conclusion hereof.

In the drawings:

Fig. 3 is a sectional view through a water power plant showing the invention applied to the discharge end of a water wheel.

Figure 1:
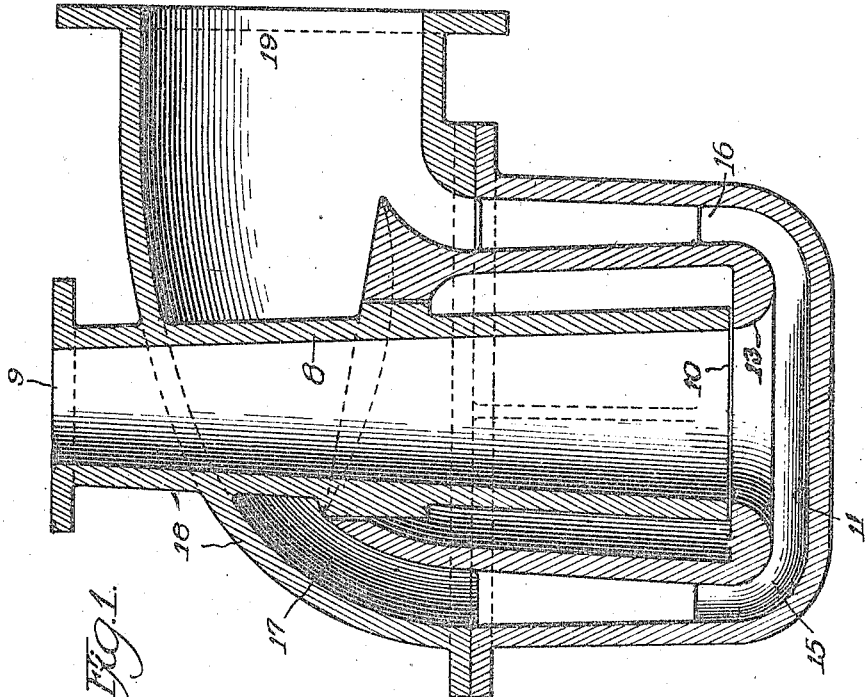
Figure 1 is a cross section in elevation of a device embodying the invention.
Figure 2:
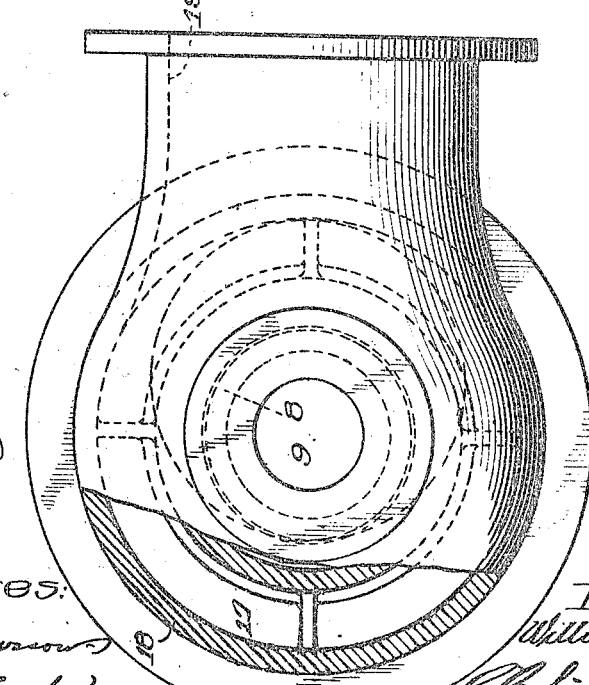
Fig. 2 is a plan view, partly in section.

The device comprises a casing consisting of a regaining section 8 of gradually increasing capacity from entrance 9 to discharge 10, a deflecting wall 11 communicating with the discharge end 10 of said section and having curved walls 13 and an annular outlet 15 between said curved walls and said deflecting wall, an annular regaining section 16 surrounding said section 8 and spaced therefrom and extending upwardly from the outlet 15, and a collecting chamber 17 connecting with said section 16 and also surrounding the tube, which chamber has a bend 18 for directing the water at an angle through the discharge outlet 19, said discharge outlet 19 being disposed in a plane slightly below the entrance 9 of the section 8. With this device the water in passing through the section 8 has some of its velocity changed into pressure after which it passes into the chamber 11 and is turned back and upwardly with a further regain in pressure from velocity through the section 16 and thence it flows around the bend and out the discharge of the collecting chamber at a lower velocity than its entrance to the device but with increased pressure and with the turn effected in a short distance.

In Fig. 3 I have shown the device previously described used as a part of the discharge conduit from a water wheel 20 operating under a low head, the runner of said wheel being located on a level near the level of the water in the tail race 21. In this instance the device is made of concrete forming the foundation of the plant and comprises a regaining conduit 22 communicating with the wheel 20 and gradually increasing in capacity in the direction of flow to its discharge end 24 which expands outwardly to form a deflecting chamber 25 having conoidal walls 26, a bottom 27 and an annular outlet 28 between said wall 26 and bottom 27, an annular chamber 29 surrounding the said section 22 and spaced therefrom by the walls 30 and extending upwardly from the outlet 28, a collecting chamber 31 communicating with said chamber 29 and extending at an angle to that of the regaining sections 22 and 29, said chamber gradually increasing in capacity in the direction of flow to its discharge at 32 into the tail race 21 though a collecting chamber of uniform cross-section throughout its length may be used if desired.

In some instances I may form the walls 26 and outlets 28 to form a deflecting chamber 25 conforming either to the shape of an inclosed hydraucone or a hydraucone regainer, as described in Patent No. 1,223,843 granted to me April 24th, 1917, for apparatus for utilizing the hydraucone action of water, for the purpose of more efficiently turning the water from the chamber 22 through substantially one hundred and eighty degrees into the chamber 29.

With the discharge conduit above described, velocity of the water passing from the wheel 20 is regained into pressure through any or all of the chambers 22, 29, and 31 and discharged into the tail water near the lower end of the wheel thereby increasing the effective head and consequently increasing the efficiency of the wheel.

I have described the enveloping passageway surrounding the initial regaining section as annular in section, but I do not limit myself to a true annular section. By annular passage under these specifications I mean a passage or series of passages of greater dimensions circumferentially than radially, and particularly one which is manifestly suitable for the purpose of accomplishing the results herein described.

The invention thus embodies a return regainer whereby pressure may be regained from velocity in a body of water turned backwardly on itself and then at an angle to its initial direction.

The invention is not to be restricted to the details of construction herein set forth but may be varied so as to be within the scope of the appended claims.

I do not claim specifically in this application a device for converting velocity head into pressure head embodying a water wheel runner having an open space immediately therebeneath and a deflector across said space leaving a free passage from the wheel to the center of the deflector, nor a deflector projected across said space and arranged substantially at right angles to the rotative axis of the runner as these are claimed in my copending application No. 769,791 entitled, "Hydraulic regainers". Nor do I claim the method of operating water wheels which consists in passing an amount of water through a wheel in excess of the amount required for the maximum efficiency of the wheel, nor by passing an amount of water through the wheel by reason of excess speed at excess of the amount required for the maximum efficiency of the wheel. Nor by operating discharge water wheels by means of utilizing energy of discharged water to produce an effective head. Nor by utilizing the centrifugal force of the whirl of the body of water at the discharge of the water wheel, the same being included in my copending application No. 774,528, "Method of increasing head".

I do not claim herein the inventions as described above but show several elements in common for the purpose of clearness and explanation. I therefore do not intend to dedicate to the public matter herein shown but not claimed, which matter is in common with the above referred to copending applications and which is therein fully described and claimed.

I claim:

1. In a closed conduit, the combination of a pressure regaining section extending in the direction of flow of the water at entrance, a pressure regaining section surrounding the initial regaining section, a conoidal deflecting chamber connecting said regaining sections together, and a discharge section communicating with said surrounding section.

2. In a closed conduit, the combination of a straight axis conduit of increasing capacity in the direction of flow, a conoidal chamber communicating with said straight axis conduit, and deflecting the water backward to its initial flow, an annular conduit of increasing capacity in the direction of flow forming a continuation of the discharge end of the deflecting chamber, said conduit surrounding said first named straight axis conduit.

3. In a closed conduit, the combination of a straight axis conduit of increasing capacity in the direction of flow, a conoidal chamber communicating with said straight axis conduit, and deflecting the water backward to its initial flow, an annular conduit of increasing capacity in the direction of flow forming a continuation of the discharge end of the deflecting chamber, said conduit surrounding said first named straight axis conduit, a discharge section communicating with said surrounding conduit.

4. A device for regaining pressure from velocity of water in motion comprising a casing having a regaining section of gradually increasing capacity in the direction of flow a deflecting chamber communicating with the discharge end of said regaining section, a regaining section communicating with said deflecting chamber and surrounding said first named regaining section, and means for communicating with said last named regaining section for discharging the water therefrom.

5. The combination, with a water wheel, of a discharge conduit leading therefrom including a pressure regaining section extending axially to the wheel in the direction of flow therefrom, a pressure regaining section surrounding the initial regaining section, a deflecting chamber connecting said regaining sections together, and a discharge section communicating with said surrounding section.

6. The combination with a water wheel, of a discharge conduit leading therefrom, said conduit gradually increasing in capacity in the direction of flow, a deflecting chamber communicating with the discharge end of said conduit, a conduit of increasing capacity in the direction of flow communicating with said deflecting chamber and extending backward to and surrounding said first named conduit.

7. The combination, with a water wheel, of a discharge conduit leading thereto including a regaining section gradually increasing in capacity in the direction of flow, a deflecting chamber communicating with the discharge end of said regaining section, an annular regaining section gradually increasing in capacity in the direction of flow and surrounding said first named regaining section, and a discharge section of gradually increasing capacity in the direction of flow communicating with said annular regaining section.

8. The combination, with a water wheel, of a discharge conduit leading therefrom including a regaining section gradually increasing in capacity in the direction of flow, a hydraucone chamber communicating with the discharge end of said regaining section, a regaining section communicating with the outlet from said hydraucone chamber and surrounding said first named section.

9. The combination, with a water wheel, of a discharge conduit leading thereto including a regaining section gradually increasing in capacity in the direction of flow, a hydraucone regainer communicating with the discharge end of said regaining section, an annular regaining section gradually increasing in capacity in the direction of flow and surrounding said first named regaining section, and a discharge section of gradually increasing capacity in the direction of flow communicating with said annular regaining section.

Signed at Chicago, Illinois, this 21st day of March, 1916.

WILLIAM M. WHITE.

Witnesses:
 T. D. BUTLER,
 A. V. GREDING.